US011698160B2

(12) United States Patent
Badger et al.

(10) Patent No.: US 11,698,160 B2
(45) Date of Patent: Jul. 11, 2023

(54) DEVICES AND METHODS FOR REPAIRING PIPES

(71) Applicant: Mueller International, LLC, Atlanta, GA (US)

(72) Inventors: Cody Badger, San Francisco, CA (US); Clifton Braun, Concord, CA (US); Adam Tank, San Francisco, CA (US)

(73) Assignee: Mueller International, LLC, Atlanta, GA (US)

( * ) Notice: Subject to any disclaimer, the term of this patent is extended or adjusted under 35 U.S.C. 154(b) by 0 days.

(21) Appl. No.: 17/713,330

(22) Filed: Apr. 5, 2022

(65) Prior Publication Data

US 2022/0228693 A1    Jul. 21, 2022

Related U.S. Application Data

(63) Continuation of application No. 16/818,501, filed on Mar. 13, 2020, now Pat. No. 11,320,083, which is a
(Continued)

(51) Int. Cl.
| | |
|---|---|
| *F16L 55/1645* | (2006.01) |
| *G01M 3/24* | (2006.01) |
| *F16L 101/20* | (2006.01) |
| *F16L 101/60* | (2006.01) |
| *F16L 55/162* | (2006.01) |
| *F16L 55/163* | (2006.01) |

(52) U.S. Cl.
CPC ..... *F16L 55/16455* (2013.01); *F16L 55/1645* (2013.01); *G01M 3/243* (2013.01); *F16L 55/162* (2013.01); *F16L 55/163* (2013.01); *F16L 2101/20* (2013.01); *F16L 2101/60* (2013.01)

(58) Field of Classification Search
CPC ..... F16L 55/16; F16L 55/163; F16L 55/1683; F16L 55/44; F16L 55/17
USPC ........................ 138/98, 97; 405/150.1, 184.1
See application file for complete search history.

(56) References Cited

U.S. PATENT DOCUMENTS

| | | |
|---|---|---|
| 2,894,539 A | 7/1959 | Cook et al. |
| 3,037,228 A | 6/1962 | Cummings |

(Continued)

FOREIGN PATENT DOCUMENTS

| | | |
|---|---|---|
| CA | 2644908 | 5/2010 |
| WO | 2000061988 | 10/2000 |

(Continued)

OTHER PUBLICATIONS

Badger, Cody; Non-Final Office Action for U.S. Appl. No. 16/112,191, filed Aug. 24, 2018, dated Oct. 31, 2019, 14 pgs.
(Continued)

*Primary Examiner* — Patrick F Brinson
(74) *Attorney, Agent, or Firm* — Taylor English Duma LLP

(57) ABSTRACT

A pipe repair device includes a body defining a first end and a second end opposite the first end; a stent configurable in a compressed configuration and an expanded configuration, the stent mounted to the body in the compressed configuration; and a locomotion subsystem configured to drive the pipe repair device through a pipe, the locomotion subsystem comprising a steering rod extending from the first end of the body and configured to engage an inner surface of the pipe.

19 Claims, 8 Drawing Sheets

Related U.S. Application Data continuation of application No. 16/112,191, filed on Aug. 24, 2018, now Pat. No. 10,627,038.

(60) Provisional application No. 62/563,189, filed on Sep. 26, 2017.

(56) References Cited

U.S. PATENT DOCUMENTS

| | | | |
|---|---|---|---|
| 3,168,909 A | | 2/1965 | Zurbrigen et al. |
| 3,895,652 A | | 7/1975 | Zach |
| 3,954,288 A | | 5/1976 | Smith |
| 4,589,447 A | | 5/1986 | Kane et al. |
| 4,647,072 A | | 3/1987 | Westman |
| 5,117,676 A | * | 6/1992 | Chang ............ G01M 3/243 73/592 |
| 5,465,758 A | | 11/1995 | Graf et al. |
| 5,878,783 A | * | 3/1999 | Smart .............. F16L 55/28 138/93 |
| 6,021,815 A | | 2/2000 | Kiest, Jr. et al. |
| 6,532,192 B1 | * | 3/2003 | Reid ............... G01S 5/22 367/127 |
| 6,820,653 B1 | | 11/2004 | Schempf et al. |
| 6,887,014 B2 | | 5/2005 | Holland |
| 6,966,950 B2 | * | 11/2005 | Winiewicz ....... F16L 55/46 118/712 |
| 7,993,469 B1 | | 8/2011 | Vallapuzha et al. |
| 8,783,297 B2 | | 7/2014 | Hawwa et al. |
| 10,627,038 B2 | | 4/2020 | Badger et al. |
| 11,320,083 B2 | | 5/2022 | Badger et al. |
| 11,530,773 B2 | | 12/2022 | Badger et al. |
| 2003/0089267 A1 | | 5/2003 | Ghorbel et al. |
| 2003/0128848 A1 | * | 7/2003 | Burnett .......... G10L 21/0208 381/71.8 |
| 2006/0118191 A1 | | 6/2006 | Rice |
| 2006/0162465 A1 | | 7/2006 | Sulzer et al. |
| 2012/0273078 A1 | | 11/2012 | Hawwa et al. |
| 2014/0116729 A1 | | 5/2014 | Al-Mulhem |
| 2015/0192672 A1 | * | 7/2015 | Doherty ............ G01S 7/54 367/88 |
| 2016/0223120 A1 | | 8/2016 | Gagliardo |
| 2016/0245448 A1 | | 8/2016 | Reichel et al. |
| 2019/0093813 A1 | | 3/2019 | Badger et al. |
| 2020/0217441 A1 | | 7/2020 | Badger et al. |
| 2022/0099230 A1 | * | 3/2022 | Badger ............ F16L 55/44 |

FOREIGN PATENT DOCUMENTS

| | | |
|---|---|---|
| WO | 2011001189 | 1/2011 |
| WO | 2019067235 | 4/2019 |

OTHER PUBLICATIONS

Badger, Cody; Notice of Allowance for U.S. Appl. No. 16/112,191, filed Aug. 24, 2018, dated Feb. 10, 2020, 6 pgs.

Badger, Cody; Non-Final Office Action for U.S. Appl. No. 16/818,501, filed Mar. 13, 2020, dated Jun. 10, 2021, 18 pgs.

Badger, Cody; Notice of Allowance for U.S. Appl. No. 16/818,501, filed Mar. 13, 2020, dated Jan. 5, 2022, 10 pgs.

Badger, Cody; Notice of Allowance for U.S. Appl. No. 16/818,501, filed Mar. 13, 2020, dated Sep. 15, 2021, 5 pgs.

Badger, Cody; International Preliminary Report on Patentability for PCT Application No. PCT/US2018/051057, filed Sep. 14, 2018, dated Apr. 9, 2020, 9 pgs.

Badger, Cody; International Search Report for PCT Application No. PCT/US2018/051057, filed Sep. 14, 2018, dated Feb. 15, 2019, 12 pgs.

Badger, Cody; Extended European Search Report for application No. 18861450.7, filed Sep. 14, 2018, dated Mar. 5, 2021, 10 pgs.

Badger, Cody; Non-Final Office Action for U.S. Appl. No. 17/550,788, filed Dec. 14, 2021, dated Sep. 21, 2022, 21 pgs.

Badger, Cody; Notice of Allowance for U.S. Appl. No. 17/550,788, filed Dec. 14, 2021, dated Nov. 1, 2022, 9 pgs.

Badger, Cody; Office Action for European patent application No. 18861450.7, filed Sep. 14, 2018, dated Oct. 6, 2022, 7 pgs.

* cited by examiner

DEVICES AND METHODS FOR REPAIRING PIPES

RELATED U.S. APPLICATION DATA

The present application is a continuation of U.S. application Ser. No. 16/818,501, filed Mar. 13, 2020, which is a continuation of U.S. application Ser. No. 16/112,191, filed Aug. 24, 2018, which issued as U.S. Pat. No. 10,627,038 on Apr. 21, 2020, which claims the benefit of U.S. Provisional Application No. 62/563,189, filed on Sep. 26, 2017, each of which are hereby incorporated by reference in their entireties.

TECHNICAL FIELD

This disclosure relates to the field of pipe repair. More specifically, this disclosure relates to a leak detection and pipe repair device for repairing a pipe.

BACKGROUND

Piping systems, including municipal water systems, can develop breaks in pipe walls that can cause leaking. Example of breaks in a pipe wall can include radial cracks, longitudinal cracks, point cracks, etc. Leaking also commonly occurs at joints in the piping system. Locating and repairing a leak in a pipe wall often requires the piping system to be shut off, which can be inconvenient for customers and costly for providers. Furthermore, de-pressurizing the pipeline can increase of the risk of undesirable foreign objects (e.g., bacteria, dirt, etc.) entering the pipeline at the location of the leak. Additionally, locating the break site and repairing the break can necessitate grandiose construction, including the digging up of streets, sidewalks, and the like, which can be costly and time-consuming.

SUMMARY

It is to be understood that this summary is not an extensive overview of the disclosure. This summary is exemplary and not restrictive, and it is intended neither to identify key or critical elements of the disclosure nor delineate the scope thereof. The sole purpose of this summary is to explain and exemplify certain concepts of the disclosure as an introduction to the following complete and extensive detailed description.

Disclosed is a pipe repair device comprising a body; a sensor attached to the body for detecting the leak in the pipe; a transport mechanism attached to the body for transporting the pipe repair device along the pipe; and a repair mechanism comprising a repair material for repairing the leak.

Also disclosed is a method for repairing a pipeline comprising inserting a pipe repair device into the pipeline; detecting a leak at a leak region in the pipeline; transporting the pipe repair device through the pipeline to the leak region; and repairing the leak.

A method for repairing a pipe is also disclosed, the method comprising isolating a controlled volume around a leak region of the pipe; creating a fluid impermeable seal around the controlled volume; and inserting repair material into the controlled volume.

Disclosed is a pipe repair stent comprising a sealing layer comprising a flexible and compressible repair material; and a spring, wherein the sealing layer is wrapped around a circumference of the spring; wherein the stent is configurable in an expanded configuration and a compressed configuration, the spring biasing the stent to the expanded configuration.

Also disclosed is a pipe repair device comprising a body defining a first end, a second end, and a middle section therebetween; a stent attached to the body, the stent comprising a sealing layer and a spring, the stent configurable in a compressed configuration and an expanded configuration; a locomotion subsystem comprising at least one wheel, the locomotion subsystem configured to drive the pipe repair device through a pipe; and a power subsystem configured to supply electrical power and carry the electrical power to the locomotion subsystem.

A method for repairing a pipe is also disclosed, the method comprising providing a stent, the stent comprising a spring and a sealing layer, the stent configurable in an expanded configuration and a compressed configuration; transporting the stent in the compressed configuration to a leak in a pipe; expanding the stent to the expanded configuration within the pipe; and engaging the sealing layer with an inner surface of the pipe at the leak to repair the leak.

Additionally, disclosed is a pipe repair device comprising a body defining a first end and a second end opposite the first end; a stent configurable in a compressed configuration and an expanded configuration, the stent mounted to the body in the compressed configuration; and a locomotion subsystem configured to drive the pipe repair device through a pipe, the locomotion subsystem comprising a steering rod extending from the first end of the body and configured to engage an inner surface of the pipe.

Also disclosed is a pipe repair device comprising a body; a stent configurable in a compressed configuration and an expanded configuration, the stent mounted to the body in the compressed configuration; and a leak detection subsystem comprising at least one sensor, the at least one sensor configured to identify a position of a leak in a pipeline; wherein the pipe repair device is transportable through the pipeline to the leak, and wherein the stent is expandable to the expanded configuration to seal the leak.

Various implementations described in the present disclosure may include additional systems, methods, features, and advantages, which may not necessarily be expressly disclosed herein but will be apparent to one of ordinary skill in the art upon examination of the following detailed description and accompanying drawings. It is intended that all such systems, methods, features, and advantages be included within the present disclosure and protected by the accompanying claims.

BRIEF DESCRIPTION OF THE DRAWINGS

The features and components of the following figures are illustrated to emphasize the general principles of the present disclosure. Corresponding features and components throughout the figures may be designated by matching reference characters for the sake of consistency and clarity.

DETAILED DESCRIPTION

Figure 1:
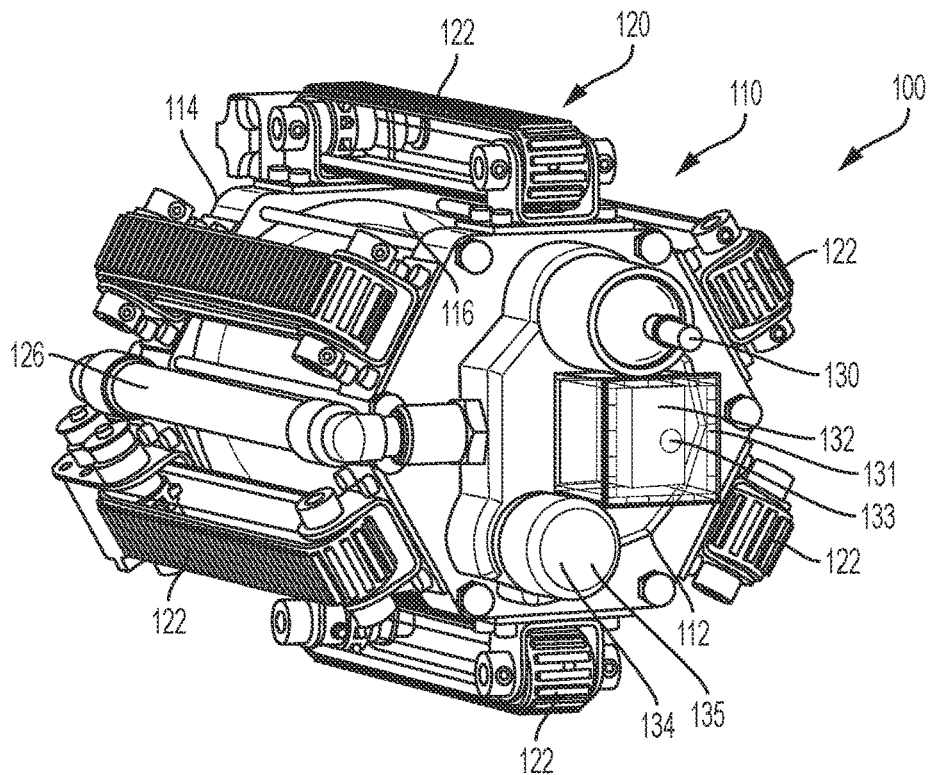
FIG. 1 is a front perspective view of a leak detection and pipe repair device, in accordance with one aspect of the present disclosure.

The present disclosure can be understood more readily by reference to the following detailed description, examples, drawings, and claims, and the previous and following description. However, before the present devices, systems, and/or methods are disclosed and described, it is to be understood that this disclosure is not limited to the specific devices, systems, and/or methods disclosed unless otherwise specified, and, as such, can, of course, vary. It is also to be understood that the terminology used herein is for the purpose of describing particular aspects only and is not intended to be limiting.

The following description is provided as an enabling teaching of the present devices, systems, and/or methods in its best, currently known aspect. To this end, those skilled in the relevant art will recognize and appreciate that many changes can be made to the various aspects of the present devices, systems, and/or methods described herein, while still obtaining the beneficial results of the present disclosure. It will also be apparent that some of the desired benefits of the present disclosure can be obtained by selecting some of the features of the present disclosure without utilizing other features. Accordingly, those who work in the art will recognize that many modifications and adaptations to the present disclosure are possible and can even be desirable in certain circumstances and are a part of the present disclosure. Thus, the following description is provided as illustrative of the principles of the present disclosure and not in limitation thereof.

As used throughout, the singular forms "a," "an" and "the" include plural referents unless the context clearly dictates otherwise. Thus, for example, reference to "an element" can include two or more such elements unless the context indicates otherwise.

Ranges can be expressed herein as from "about" one particular value, and/or to "about" another particular value. When such a range is expressed, another aspect includes from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint.

For purposes of the current disclosure, a material property or dimension measuring about X or substantially X on a particular measurement scale measures within a range between X plus an industry-standard upper tolerance for the specified measurement and X minus an industry-standard lower tolerance for the specified measurement. Because tolerances can vary between different materials, processes and between different models, the tolerance for a particular measurement of a particular component can fall within a range of tolerances.

As used herein, the terms "optional" or "optionally" mean that the subsequently described event or circumstance can or cannot occur, and that the description includes instances where said event or circumstance occurs and instances where it does not.

The word "or" as used herein means any one member of a particular list and also includes any combination of members of that list. Further, one should note that conditional language, such as, among others, "can," "could," "might," or "may," unless specifically stated otherwise, or otherwise understood within the context as used, is generally intended to convey that certain aspects include, while other aspects do not include, certain features, elements and/or steps. Thus, such conditional language is not generally intended to imply that features, elements and/or steps are in any way required for one or more particular aspects or that one or more particular aspects necessarily include logic for deciding, with or without user input or prompting, whether these features, elements and/or steps are included or are to be performed in any particular aspect.

Disclosed are components that can be used to perform the disclosed methods and systems. These and other components are disclosed herein, and it is understood that when combinations, subsets, interactions, groups, etc. of these components are disclosed that while specific reference of each various individual and collective combinations and permutation of these may not be explicitly disclosed, each is specifically contemplated and described herein, for all methods and systems. This applies to all aspects of this application including, but not limited to, steps in disclosed methods. Thus, if there are a variety of additional steps that can be performed it is understood that each of these additional steps can be performed with any specific aspect or combination of aspects of the disclosed methods.

Disclosed in the present application is a leak detection and pipe repair device and associated methods, systems, devices, and various apparatus. Example aspects of the leak detection and pipe repair device can comprise a locomotion subsystem, a leak detection subsystem, and a pipe repair subsystem. It would be understood by one of skill in the art that the disclosed leak detection and pipe repair device is described in but a few exemplary aspects among many. No particular terminology or description should be considered limiting on the disclosure or the scope of any claims issuing therefrom.

Figure 2:
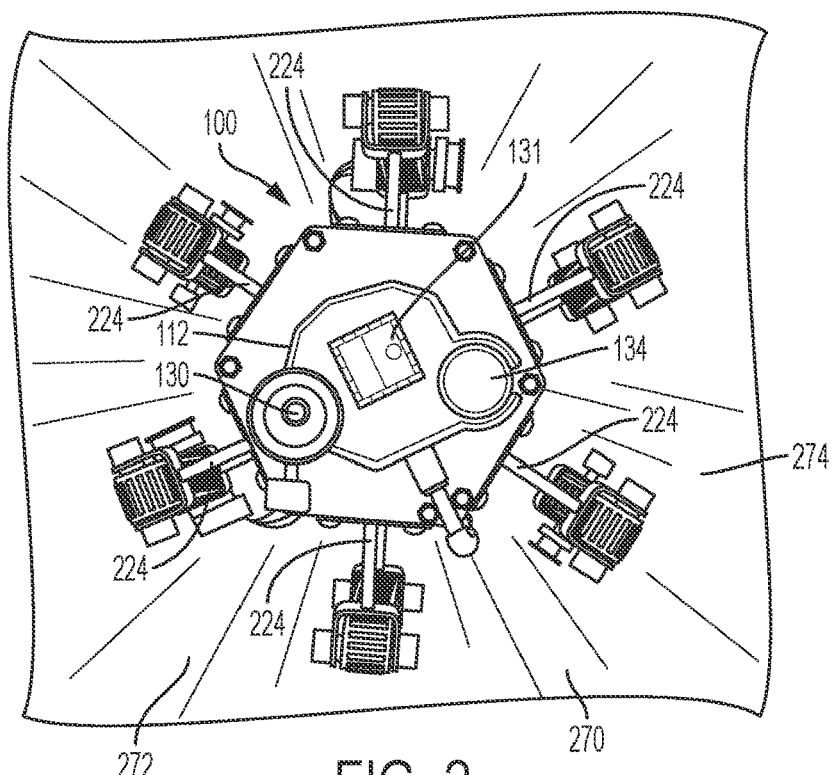
FIG. 2 is a front view of the leak detection and pipe repair device of FIG. 1 within a pipe.
Figure 3:
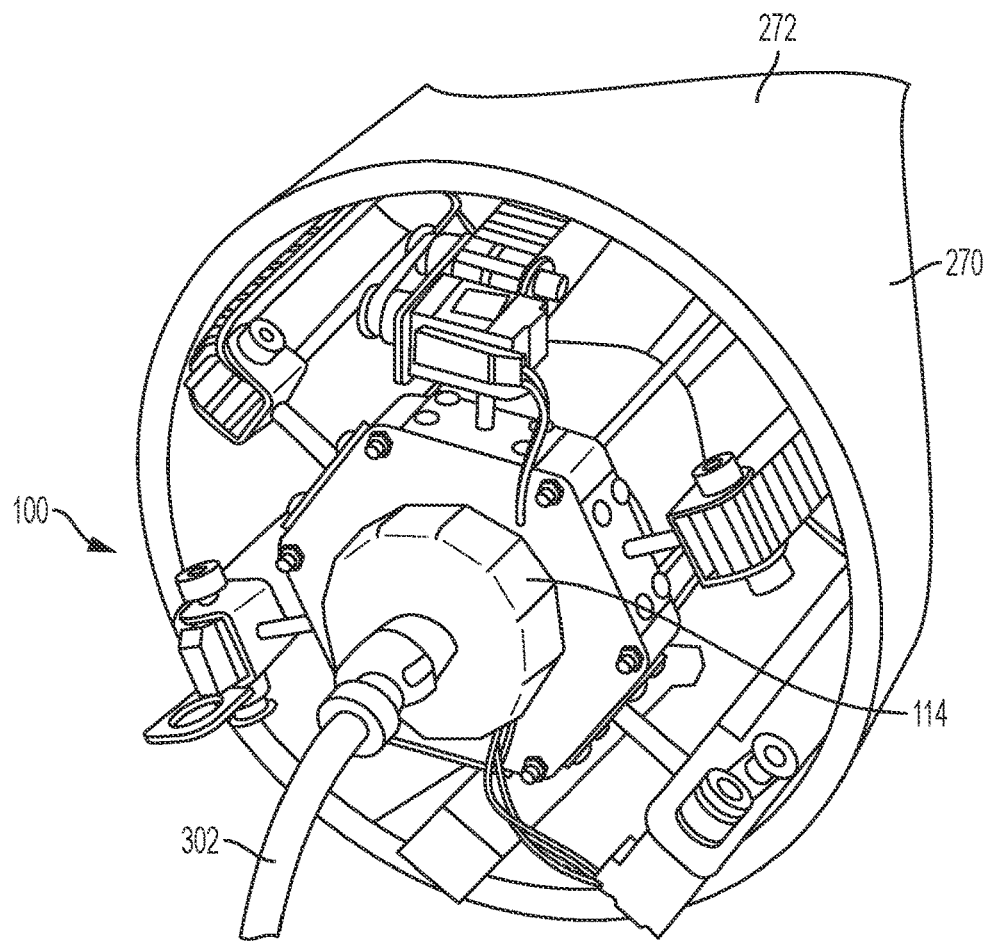
FIG. 3 is a back perspective view of the leak detection and pipe repair device of FIG. 1 partially inserted into the pipe of FIG. 2.
Figure 4:
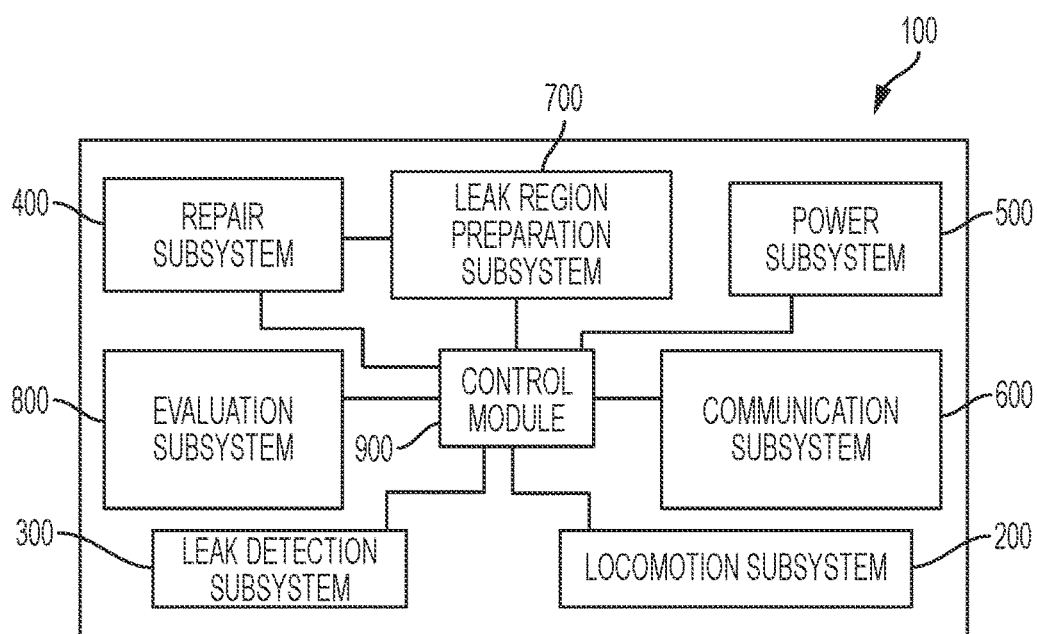
FIG. 4 is a schematic representation of the subsystems of the leak detection and pipe repair device of FIG. 1, in accordance with another aspect of the present disclosure.

FIGS. 1-3 illustrates a first aspect of a leak detection and pipe repair device 100 (hereinafter, the "pipe repair device 100"), according to the present disclosure. Example aspects of the pipe repair device 100 can drive through a pressurized pipeline 270 (shown in FIG. 2), detect a leak 580 (shown in FIG. 5) in a pipe 272 (shown in FIG. 2) of the pipeline 270, and repair the damage to the pipe 272 at the location of the leak 580 (e.g., the leak region 582, shown in FIG. 5). Referring to the block diagram of FIG. 4, these functions can be performed by various subsystems of the pipe repair device 100. Example aspects of the pipe repair device 100 can comprise a locomotion subsystem 200, a leak detection subsystem 300, and a pipe repair subsystem 400, as will be described in further detail below. The pipe repair device 100 further can comprise a power subsystem 500 and a communications subsystem 600. In some aspects, the pipe repair device 100 can also comprise a leak region preparation subsystem 700 and/or a repair evaluation subsystem 800. According to the example aspects, the various subsystems of the pipe repair device 100 can be controlled by a control module 900. In some aspects, the pipe repair device 100 can be used in municipal drinking water systems, while other aspects, the pipe repair device 100 can be used in other pipeline 270 systems, such as oil pipelines, gas pipelines, etc.

Control Module 900

Example aspects of the control module 900 can function to provide control instructions to the various subsystems of the pipe repair device 100. The control module 900 can also function to generate control instructions in response to and/or based on sensor inputs. In example aspects, the control module 900 can be self-contained within the pipe repair device 100 and can comprise a processor (not shown) attached to the pipe repair device 100. In a second aspect, the control module 900 can be implemented at a remote computing system (not shown) and can be connected to the pipe repair device 100 by a data link (e.g., a wired tether 302 (shown in FIG. 3), a wireless link, etc.). However, the control module 900 can be otherwise suitably implemented in other aspects.

Power Subsystem 500

The power subsystem 500 can function to provide power to the various subsystems of the pipe repair device 100 in order to facilitate operation of the subsystems. In a first aspect, the power subsystem 500 can comprise the tether 302 that can carry electrical power from a surface generator (not shown) to the pipe repair device 100 within the pipeline 270. In a second aspect, the power subsystem 500 can comprise a battery module (not shown) onboard the pipe repair device 100. However, in other aspects, the power subsystem 500 can comprise any suitable energy storing and/or generating components.

Communications Subsystem 600

The pipe repair device 100 can also comprise the communications subsystem 600 in various aspects. The communications subsystem 600 can function to transmit and receive control instructions and sensor inputs. In one aspect, the communications subsystem 600 can comprise a serial data bus (not shown) connected to the tether 302 that directly connects the pipe repair device 100 to a computing system (not shown) outside of the pipeline 270 (e.g., providing a serial data connection). In another example, the communications subsystem 600 can comprise a wireless radio (not shown) that can be connected to the computing system by a wireless data link. In yet another example, the communications subsystem 600 can comprise an acoustic-data transducer (not shown) that can send and receive signals transmitted as vibrations through a wall of the pipeline 270 and/or the water within the pipeline 270. In other aspects, the communications subsystem 600 can comprise any other suitable components for communicating between the pipe repair device 100 and the computing system.

Locomotion Subsystem 200

As shown in FIGS. 1-3, the pipe repair device 100 can comprise a body 110 defining a first end 112, an opposite second end 114, and a middle section 116 therebetween. Optionally, the body 110 can be formed from an NSF/ANSI 61 certified material that is approved as safe for use in drinking-water applications, such as, for example, stainless steel. In other aspects, the body 110 can be formed from another suitable material, such as, for example, aluminum, other metals, plastic, etc. As best seen in FIG. 3, the tether 302 can be attached to the second end 114 of the body 110, such that the tether 302 trails behind the pipe repair device 100 as it moves in a forward direction through the pipeline 270.

The locomotion subsystem 200 can function to transport the pipe repair device 100 within the pipeline 270 to the leak region 582. As shown in FIG. 1, the locomotion subsystem 200 can comprise a transport mechanism 120 for transporting the pipe repair device 100 along an inner surface 274 (shown in FIG. 2) of the pipeline 270. In a specific example aspect, the transport mechanism 120 can comprise radially-repositionable continuous tracks 122 attached to the body 110 (e.g., six continuous tracks 122 positioned equidistant azimuthally about the pipe repair device 100, as shown) that can be biased against the inner surface 274 of the pipeline 270. In one aspect, each of the tracks 122 substantially spans a length of the middle region of the body 110, from the first end 112 to the second end 114.

In one aspect, as depicted, each the tracks 122 can be biased against the inner surface 274 of the pipeline 270 by a hydraulic cylinder (not shown). For example, an onboard pump 126 can pump fluid to the hydraulic cylinders, and the fluid can apply pressure to a piston 224 (shown in FIG. 2) of the hydraulic cylinder. The piston 224 can force the respective track 122 outward against the inner surface 274 of the pipeline 270. According to example aspects, the hydraulic cylinders can allow the pipe repair device 100 to accommodate for pipes of varying interior diameters because the tracks 122 can be radially repositionable relative to the body 110. For example, in the depicted aspect, the pistons 224 can move into and out of the body 110 to adjust the distance between the tracks 122 and the body 110. Furthermore, example aspects of the tracks 122 can have a certain degree of compliance, which can provide for improved maneuverability of the pipe repair device 100 around turns in the pipeline 270. In some aspects, the locomotion subsystem 200 further can comprise a pressure sensor (not shown) in each of the hydraulic cylinders. The pressure sensors can be configured to measure the pressure applied by the fluid to the pistons 224. The pressure data can be communicated to the control module 900, and the control module can control adjustments to the pressure, as necessary, for improved maneuverability.

In another aspect, the tracks 122 can be biased against the inner surface 274 of the pipeline 270 by pneumatic cylinders. In such an aspect, compressed air can be used to force the tracks 122 outward against the inner surface 274 of the pipeline 270. In still other aspects, the tracks 122 can be biased against the inner surface 274 of the pipeline 270 by other suitable biasing means, such as, for example, a compression spring or by a controllable scissor-jack mechanism. Moreover, in other aspects, the pipe repair device 100 can comprise alternative or additional mechanisms for rolling, sliding, gliding, or otherwise moving along the inner surface 274 of the pipeline 270, such as, for example, wheels.

Figure 15:
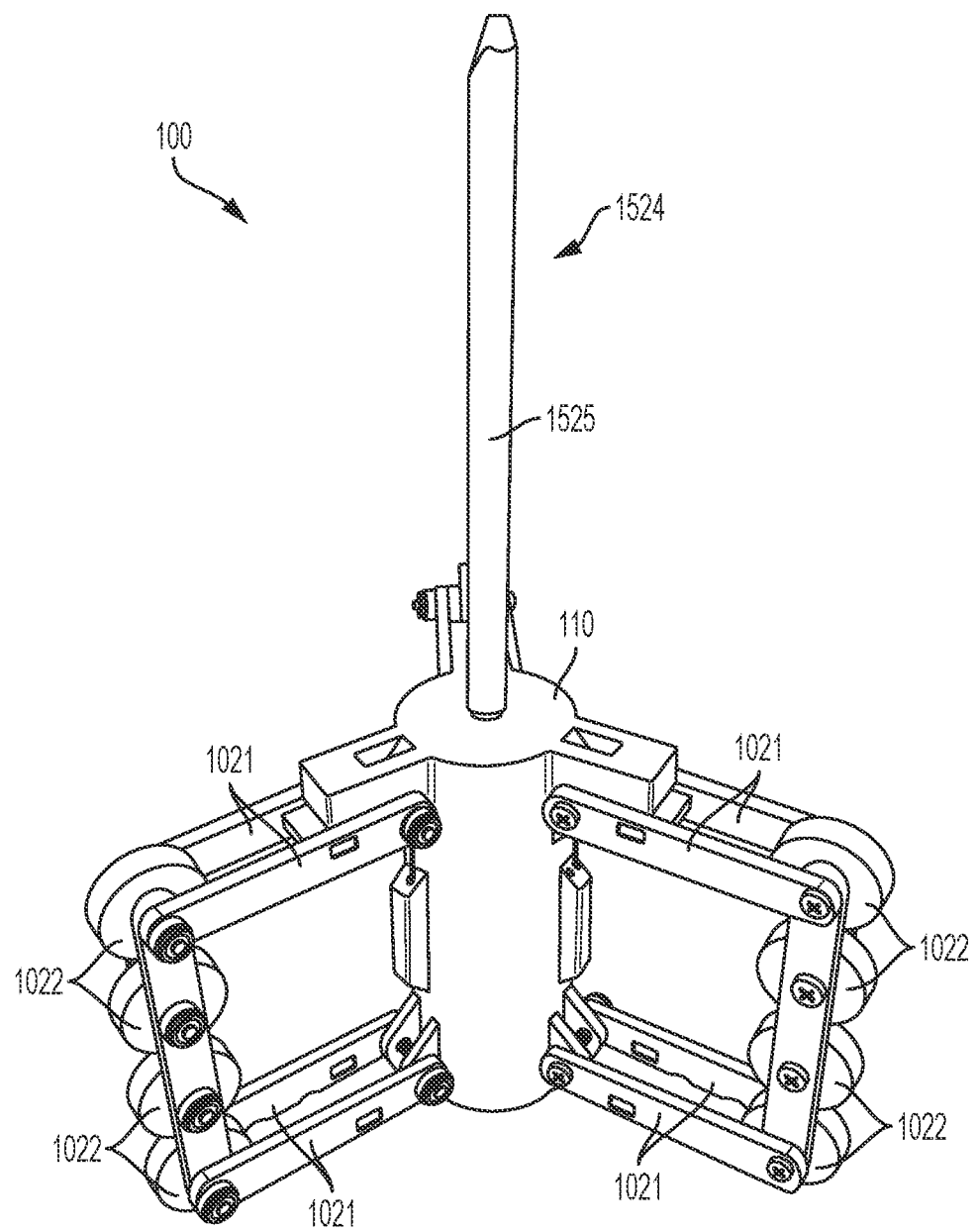
FIG. 15 is a perspective view of the leak detection and repair device according to another aspect of the present disclosure.

For example, FIGS. 10-15 illustrate additional example aspects of the pipe repair device 100 and locomotion subsystem 200. Each aspect of the pipe repair device 100 can comprise the body 110 and one or more wheels 1022 for engaging the inner surface 274 of the pipeline 270 (shown in FIG. 2). As shown, the wheels 1022 can be connected to one or more pivotable arms 1021 that can allow the wheels 1022 to be radially repositioned to accommodate for varying pipe diameters. In some aspects, the pivotable arms 1021 can be biased outward by springs 1023. Furthermore, as shown in FIG. 15, example aspects of the pipe repair device 100 can comprise a connector 1524 for physically connecting the pipe repair device 100 to the environment outside of the pipeline 270 (shown in FIG. 2). For example, as shown, the connector 1524 can be a pushrod 1525 for pushing the pipe repair device 100 through the pipeline 270. In other aspects, the connector 1524 can be a tether, wire, or any other suitable connection mechanism.

Referring back to FIGS. 1-3, example aspects of the tracks 122 can be driven by one or more electric motors (not shown) that are operable while the pipe repair device 100 is submerged in fluid flowing through the pipeline 270. Optionally, the pipe repair device 100 can comprise at least two motors that can be differentially driven to facilitate maneuvering the pipe repair device 100 around turns in the pipeline 270. For example, in one aspect, the pipe repair device 100 can comprise a first motor and a second motor (first and second motors not shown). When approaching a turn in the pipeline, the speed of the first motor can be slowed in order to slow the tracks 122 driving on the inside of the turn, to facilitate navigation around the turn. In other aspects, the locomotion subsystem 200 can additionally or alternatively comprise one or more impellers, propellers, synthetic flagella, and/or any other suitable mechanisms for locomotion within the pipeline 270. In example aspects, the locomotion of the pipe repair device 100 can be remotely operated by a remote operator (e.g. a technician) outside of the pipeline 270 (e.g., above ground).

Example aspects of the locomotion subsystem 200 can comprise a steering rod 130 extending from the first end 112 of the body 110. The steering rod 130 can be movable relative to the body 110 of the pipe repair device 100 and can serve to guide the pipe repair device 100 in a preferred direction at an intersection in the pipeline 270. In one example aspect, the intersection can be a tee fitting (not shown) in the pipeline 270, and the pipe repair device 100 can move in either a left direction into a left-side pipe segment or a right direction into a right-side pipe segment. The steering rod 130 can be pointed in the preferred direction (e.g., left or right) and the pipe repair device 100 can be driven forward. As the pipe repair device 100 is driven forward, the steering rod 130 can engage the inner surface 274 of the preferred pipe segment (e.g. the left-side segment or right-side segment), and the pipe repair device 100 will turn in the preferred direction. In example aspects, the steering rod 130 can be actuated mechanically or electronically by the remote operator.

Example aspects of the locomotion subsystem 200 can be configured to navigate bends, tees, and vertical sections of the pipeline 270. The locomotion subsystem 200 can also allow for both forward and reverse movement through the pipeline 270. For example, the pipe repair device 100 can drive in a forward direction through the pipeline 270 to the leak region 582, and then drive in a reverse direction out of the pipeline 270 upon completion of repairs to the leak region 582. In example aspects, the tether 302 can also allow a remote operator to manually pull the pipe repair device 100 out of the pipeline 270 in an instance where the pipe repair device 100 is unable to drive itself out of the pipeline 270. Examples of such instances can include malfunctioning of the locomotion subsystem 200, power subsystem 500, or control module 900.

Leak Detection Subsystem 300

Example aspects of the pipe repair device 100 can further comprise the leak detection subsystem 300, which can function to identify the presence of the leak 580 and the position of the leak region 582 requiring repair relative to the pipe repair device 100, in order to enable the pipe repair device 100 to suitably position itself relative to the leak region 582 for a repair. In a first aspect, the pipe repair device 100 can comprise an image sensor 132 (e.g., a camera 133) for visually identifying the leak region 582. In an example of this aspect, the pipe repair device 100 can stream video data collected via the image sensor 132 to a remote operator in order to manually identify the leak region 582 based on the visibility of damage to the pipe 272. As shown, the camera 133 can be disposed within a protective housing 131. Some aspects of the pipe repair device 100 can also comprising a lighting mechanism (not shown) for illuminating the interior of the pipeline 270 for improved visibility. In a second aspect, the pipe repair device 100 can comprise an acoustic microphone 134 (e.g., a hydrophone 135) for aurally identifying the leak region 582. For example, the pipe repair device 100 can comprise one or more hydrophones 135 that can identify the axial and azimuthal position of the leak region 582 based on triangulation of hydrophone-derived audio signatures corresponding to leakage out of the pipeline 270. In some aspects, as shown in FIG. 1, the leak detection subsystem 300 can comprise both the image sensor 132 and the acoustic microphone 134 for improved detection of the leak region 582 and positioning of the pipe repair device 100 for repairing the leak region 582.

Other example aspects of the pipe repair device 100 can comprise additional or alternative technologies for detecting a leak 580 within the pipeline 270. For example, other technologies can include, but are not limited to, ultrasound, magnetic flux, lidar, sonar, laser, spectral aerial imaging, and light/infrared technologies. Yet another technology for detecting a leak 580 can include inserting dyes or gasses into the pipeline 270 and measuring for seepage through the leak 580.

Upon detection of the leak 580, the locomotion subsystem 200 can transport the pipe repair device 100 within the pipeline 270 to the leak region 582 and, using the leak detection subsystem 300, position the pipe repair device 100 at an ideal location for repairing the leak region 582. The locomotion subsystem 200 can transport the pipe repair device 100 to the leak region 582 after the leak 580 is identified, or can transport the pipe repair device 100 contemporaneously with locating the leak region 582 (e.g., transport the pipe repair device 100 though the pipeline 270 and identify the leak region 582 as the pipe repair device 100 traverses the pipeline 270). Moreover, in some aspects, other factors or mechanisms can additionally or alternatively aid in the movement of the pipe repair device 100 axially through the pipeline 270 to the leak region 582. For example, a current of the fluid in the pipeline 270, a water hammer introduced into the pipeline 270 to generate a pressure force, or, as noted above, a propulsion mechanism, such as an impeller, propeller, and/or any other suitable submersible propulsion mechanism can assist in moving the pipe repair device 100 to the leak region 582. According to example aspects, the leak detection subsystem 300 can be used to locate additional leak regions 582 requiring repair before, during, or after repair of the first leak region 582.

Leak Region Preparation Subsystem 700

Figure 5:
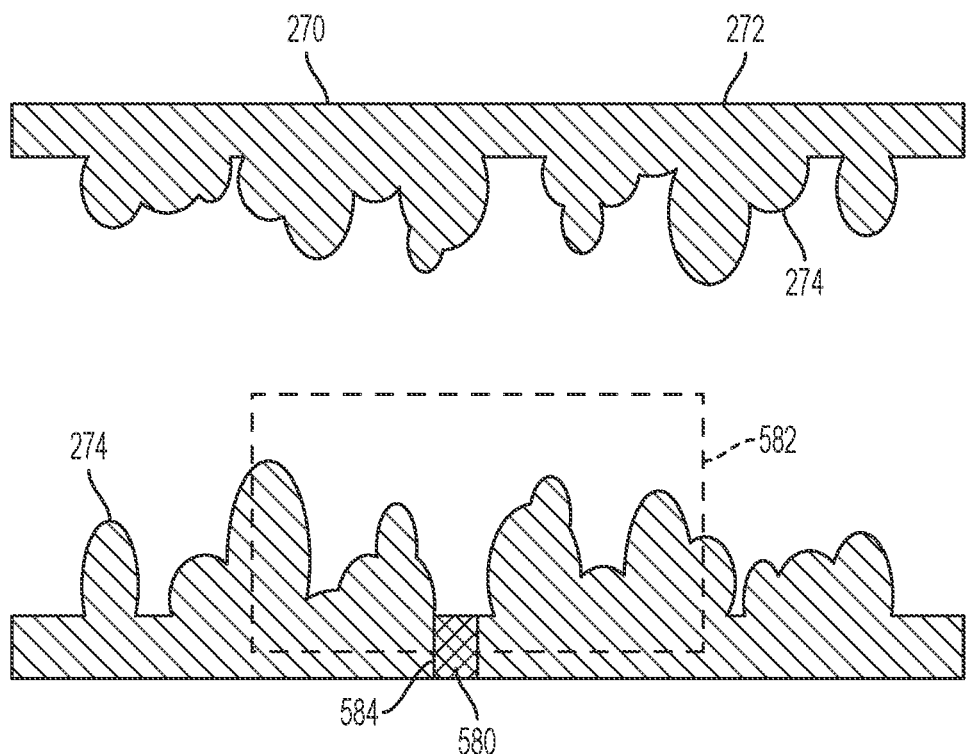
FIG. 5 is a cross-sectional side view of a pipe according to another aspect of the present disclosure.
Figure 6:
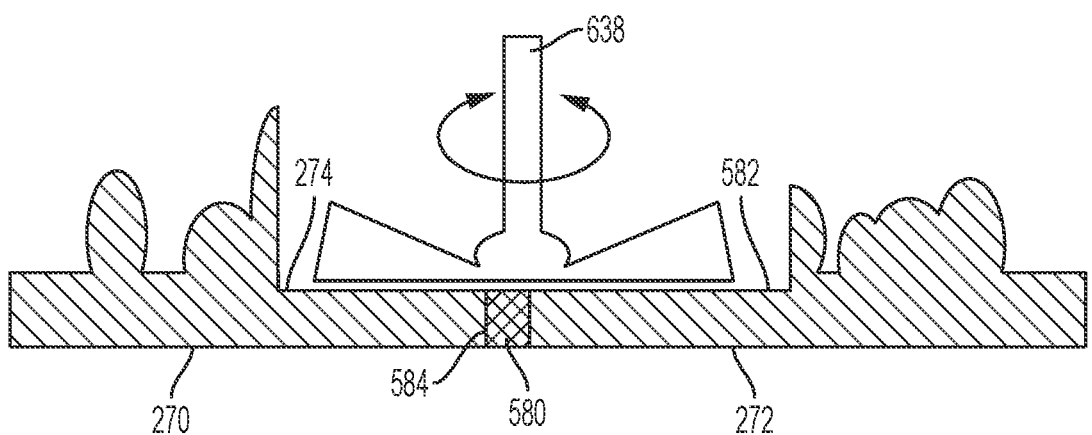
FIG. 6 is a cross-sectional side view of the pipe of FIG. 5 and a resurfacing mechanism of the leak detection and pipe repair device of FIG. 1.

FIG. 5 illustrates an example aspect of the pipe 272 of the pipeline 270 comprising the leak 580. Example aspects of the leak 580 can be caused by a crack 584 in the pipe 272. The crack 584, and in some aspects the surrounding area, can define the leak region 582. As shown in FIG. 6, some example aspects of the pipe repair device 100 can comprise the leak region preparation subsystem 700. The leak region preparation subsystem 700 can comprise a resurfacing mechanism 638 that can, in variations, function to grind, ablate, scour, and/or otherwise suitably remove material from the inner surface 274 of the pipe 272 in the leak region 582. In additional or alternative aspects, the resurfacing mechanism 638 can overlay additional material on the inner surface 274 (e.g., fill in uneven areas of the inner surface 274 with additional material to prepare a substantially smooth inner surface 274 at the leak region 582). In some aspects, the leak region preparation subsystem 700 can comprise a volume control mechanism (not shown) that functions to control a controlled preparation volume of the pipe 272 proximal the leak region 582. Example aspects of the volume control mechanism can isolate the controlled preparation volume. The volume control mechanism can provide a suction force to the controlled preparation volume proximal the leak region 582 (e.g., to prevent removed pipe material and/or resurfacing material from being entrained in fluid flowing through the pipe 272 and carried downstream), a barrier to temporarily block and/or limit fluid flow passed the barrier (e.g., an inflatable bladder and/or balloon that can be expanded downstream of the leak region 582), or any other suitable mechanism for regulating the conditions of the controlled preparation volume proximal the leak region 582. Other example aspects of the pipe repair device 100 may not comprise the leak region preparation subsystem 700.

Pipe Repair Subsystem 400

The pipe repair device 100 can also comprise the pipe repair subsystem 400 for repairing the leak region 582 in the pipeline 270 detected by the leak detection subsystem 300 described above. The pipe repair subsystem 400 can function to reduce the leak rate through the leak region 582 of the pipe 272 to and/or below a leak rate threshold by applying a repair material to the leak region 582. Applying the repair material functions to provide an impermeable mechanical barrier between the fluid (e.g., water) within the pipeline 270 and the environment external to the walls of the pipe 272 in order to repair the leak 580. Example aspects of the repair material can be a NSF/ANSI 61 certified material that is approved as safe for use in drinking-water applications The leak rate threshold can be a zero-leakage rate (e.g., completely reducing the leak rate), less than a known lowest leak rate of the piping system (e.g., to reduce the minimum leak rate of the piping system), less than a known average leak rate of the piping system (e.g., to reduce the average leak rate of the piping system), and/or any other suitable leak rate threshold.

Figure 7:
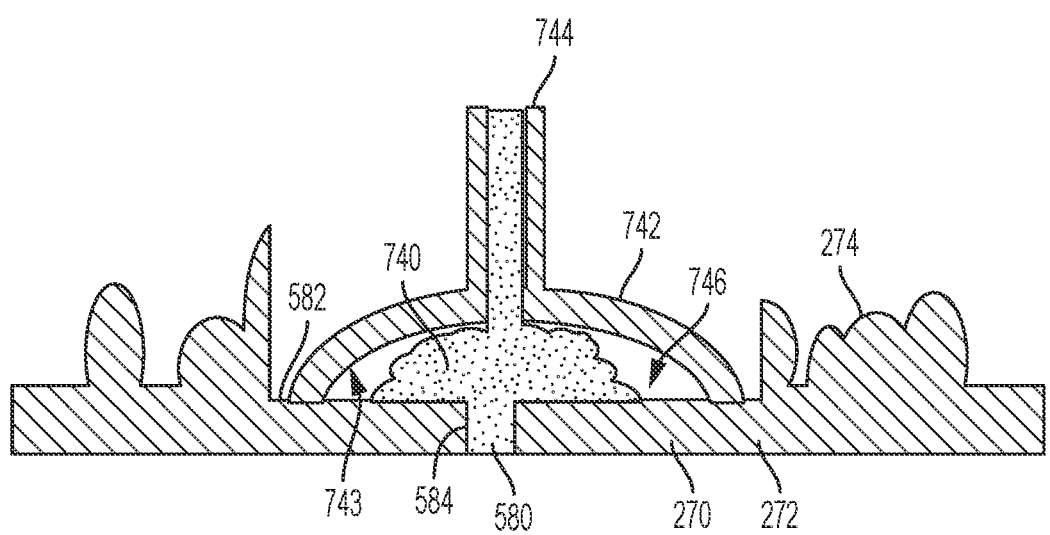
FIG. 7 is a cross-sectional side view of the pipe of FIG. 5 and a repair mechanism comprising a cap and repair material, according to another aspect of the present disclosure.

In a first aspect, as shown in FIG. 7, the repair material can comprise a liquid-phase repair material. Specifically, the repair material can be epoxy reagents 740. The epoxy reagents 740 can be, for example, an acrylic-based mixture, a polyester-based mixture, a resin-based mixture, or any other suitable epoxy mixture. In aspects wherein the repair material is a liquid-phase repair material, the repair material can comprise a binder. The binder can be an organic binder, an inorganic binder, a combination thereof, and/or any suitable binder. In examples, the repair material can comprise a water-insoluble cement, plaster, polymer compound (e.g., epoxy, thermoplastic, foam filler material, resin, etc.), and/or any other suitable material that can be applied to the leak region 582 in a liquid or semi-liquid phase. The repair material and/or components thereof can optionally comprise curable compounds (e.g., compounds that solidify upon curing). Such compounds can be curable via heat application, exposure to water, exposure to other compounds (e.g., a reagent that causes a phase-change in the curable compound), exposure to electromagnetic radiation (e.g., ultraviolet light), and/or curable in any other suitable manner.

As shown in FIG. 7, the pipe repair device 100 can comprise a flexible cap 742. The flexible cap 742 can be pressed against the inner surface 274 of the pipe 272 at the leak region 582 to isolate a controlled volume 746 around the leak region 582. The pressing force can be generated by the pipe repair subsystem 400, be generated by the surrounding water pressure within the pipe 272 (e.g., leveraging the low-pressure region proximal the leak 580 to drive cap attachment), or be otherwise generated and applied. In example aspects, the flexible cap 742 can also function as the volume control mechanism of the leak region preparation subsystem 700, such that the controlled volume 746 can also be the controlled preparation volume. However, in other aspects, the flexible cap 742 can be separate from the volume control mechanism. The flexible cap 742 can create a fluid-impermeable seal around the leak region 582, such that fluid flowing through the pipe 272 cannot enter the controlled volume 746, and such that the repair material cannot escape the controlled volume 746.

The pipe repair subsystem 400 can pump the epoxy reagents 740 into the controlled volume 746 defined within the flexible cap 742 through an opening 744 in the flexible cap 742 In example aspect, the epoxy reagents 740 can be mixed within the controlled volume 746 (e.g., using an agitator, by modulating the in-flow of the reagents 740 to layer the reagents 740 within the controlled volume 746 such that passive diffusion processes result in mixing, etc.). Some aspects of the pipe repair subsystem 400 can comprise a mixing nozzle (not shown) for mixing the epoxy reagents 740.

The injected volume of binder can be a predetermined amount, a dynamically determined amount (e.g., a small amount if the leak 580 is proximal the bottom or nadir of the pipe; the controlled volume 746 if the leak 580 is proximal the top or apex of the pipe), or be any suitable volume. In an example aspect, injecting the epoxy reagents 740 can displace fluid (not shown) that is isolated within the controlled volume 746 (e.g., through a one-way check valve embedded in the flexible cap 742). In another aspect, the epoxy can be injected through a nozzle that emerges into the controlled volume 746. A bubble can be injected into the epoxy flow such that when the controlled volume 746 has been filled with the injected epoxy, the bubble can be liminal to the boundary between the controlled volume 746 and the nozzle (e.g., to create a discontinuous region between the epoxy inside the controlled volume 746 and the source of the epoxy). In still another aspect, ultraviolet light can be transmitted into the controlled volume 746 (e.g., via fiber-optic cabling, transparent walls of the flexible cap 742, etc.) and can cure the epoxy.

In another aspect, the flexible cap 742 can be attached to the inner surface 274 of the pipe 272 by the epoxy (e.g., after curing and/or solidification of the epoxy), and can be left at the repaired leak region 582 (e.g., detached from the pipe repair device 100) after repairing the leak 580. In a similar aspect, the epoxy reagents 740 can be contained within sub-compartments attached to an outside of the flexible cap 742, and repairing the leak 580 can comprise compressing the cap 742 against the leak region 582 to simultaneously inject the epoxy reagents 740 from the sub-compartments into the controlled volume 746, mixing the reagents 740 within the controlled volume 746, and biasing the epoxy mixture against the leak region 582 to fill the leak 580 and repair the leak 580 upon solidification of the epoxy mixture. However, in other aspects, the flexible cap 742 can be reusable (e.g., withdrawn from the inner surface 274 of the pipe 272 after epoxy solidification and/or curing).

Some example aspects of the pipe repair subsystem 400 can further comprise a separating mechanism (not shown) for mechanically separating the solidified epoxy from the source of the epoxy (e.g., the nozzle). For example, the separating mechanism can be a blade, a scissor-like mechanism, or any other suitable mechanism for cutting the epoxy away from the source.

Figure 8:
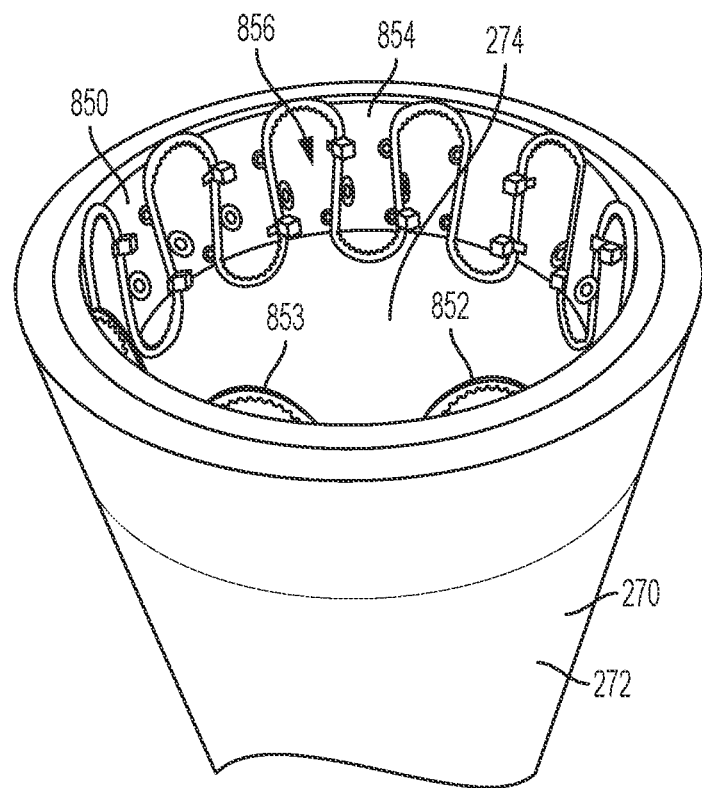
FIG. 8 is a perspective view of the pipe of FIG. 2 and a repair mechanism comprising a stent, according to another aspect of the present disclosure.

In a second aspect, as shown in FIG. 8, the pipe repair subsystem 400 can comprise a stent 850 for repairing the leak 580 at the leak region 582 (shown in FIG. 5). Example aspects of the stent 850 can be expandable and compressible, such that the stent 850 can be oriented in an expanded configuration, as shown, and a compressed configuration (not shown). The stent 850 can comprise a spring 852 and a sealing layer 854 defining a substantially cylindrical structure. A void 856 can extend through a center of the cylindrical structure. The spring 852 can bias the stent 850 to the expanded configuration, as shown. In the present aspect, the spring 852 can comprise a metal wire 853 defining a wave pattern in the axial direction. However, other aspects of the spring 852 can comprise any other suitable material and define any other suitable spring pattern or design. The sealing layer 854 can wrap around a circumference of the spring 852, engaging an outer surface of the spring 852. Example aspects of the sealing layer 854 can comprise a flexible and compressible material, such as, for example, neoprene. In other aspects, the sealing layer 854 can be formed from foam, another rubber material, epoxy, silicone, or any other suitable flexible material for providing a watertight seat between the stent 850 and the inner surface 274 of the pipe 272 at the leak region 582. Optionally, the spring 852 and sealing layer 854 can be formed from NSF/ANSI 61 certified materials that are approved as safe for use in drinking-water applications.

The stent 850 can be oriented in the compressed configuration for transport of the stent 850 by the pipe repair device 100 to the leak region 582. The stent 850 can be compressed by a compression mechanism, such as a compression sleeve (not shown). In other aspect, a tensioning mechanism can be used to orient the stent 850 in the compressed configuration, such as, for example, a cable (not shown) configured to contract the stent 850 radially inward. As the stent 850 is driven through the pipeline 270 by the pipe repair device 100, fluid in the pipeline 270 can continue to flow around and/or through the compressed stent 850. As such, the flow of fluid in the pipeline 270 can continue uninterrupted as the stent 850 is navigated through the pipeline 270. According to example aspects, the stent 850 can be positioned proximate the leak 580 and can be expanded within the pipe 272 by removing a compression force applied by the compression mechanism. In the expanded configuration, the sealing layer 854 can engage the inner surface 274 of the pipe 272 at the leak region 582. The sealing layer 854 can press against the leak region 582 to create a watertight seal between the stent 850 and the inner surface 274 of the pipe 272 at the leak region 582 to repair the leak 580. As such, the sealing layer 854 of the stent 850 can serve as the repair material. In example aspects, fluid pressure from the fluid flow in the pipeline 270 can also assist in pressing the stent 850 against the inner surface 274 of the pipe 272.

With the stent 850 positioned in the pipe 272 in the expanded configuration, fluid in the pipeline 270 can flow through the void 856 in the stent 850. Example aspects of the stent 850 can be sized and shaped to fit tightly within the pipeline 270 in the expanded configuration. For example, in one aspect, a diameter of the stent 850 in the expanded configuration can be slightly greater than a diameter of the inner surface 274 of the pipe 272. The tight fit of the stent 850 within the pipe 272, along with fluid pressure against the stent 850, can aid in retaining the stent 850 in position at the leak region 582. Some aspects of the stent 850 can also comprise an attachment mechanism (not shown), such as an adhesive, for attaching the stent 850 to the inner surface 274 of the pipe 272 at the leak region 582. Whether an attachment mechanism is desired, and the type of attachment mechanism, can be determined based on the surface friction of inner surface 274 of the pipe 272 at the leak region 582 and the surface friction of the sealing layer 854.

Example aspects of the pipe repair subsystem 400, or portions thereof, can be attached to the body 110 of the pipe repair device 100 at any location. In one aspect, wherein the pipe repair subsystem 400 comprises the stent 850, the stent 850 can be attached to the pipe repair device 100 at the second end 114 of the body 110, such that the stent 850 trails behind the pipe repair device 100 as it moves forward through the pipeline 270. Once the stent 850 has been positioned as desired and expanded to repair the leak 580, the pipe repair device 100 can reverse out of the pipeline 270, passing through the void 856 of the stent 850. In other aspects, the stent 850 can be located elsewhere.

In a third aspect, the repair material can comprise metal compounds introduced into the leak region 582 to repair the leak 580. For example, repairing the leak 580 can comprise spot-welding the leak 580, and the repair material can comprise pipe material proximal the leak region 582 and/or additional metallic filler material that is melted into the leak region 582 (e.g., using a submersible welding head) and cooled (e.g., actively cooled, passively cooled) in situ to repair the leak 580.

While the repair technologies of a stent 850, an underwater liquid-phase epoxy injection, and spot-welding are discussed in detail in this application, other example aspects of the pipe repair device 100 can comprise additional or alternative technologies for repairing the leak 580 within the pipeline 270. For example, other technologies and/or repair materials can include, but are not limited to, an inflatable sleeve, natural rubber, synthetic rubber such as EPDM rubber, cyanoacrylates, tape, epoxy putty, concrete, cement, resin, an epoxy or resin-soaked cloth, and magnets. Example aspects of the epoxy putty can be an acrylic-based epoxy putty, a polyester-based epoxy putty, a resin-based epoxy putty, or any other suitable epoxy putty. Furthermore, example aspects of the epoxy-soaked cloth can comprise an acrylic-based epoxy, a polyester-based epoxy, a resin-based epoxy, or any other suitable epoxy. Moreover, the repair material can comprise a compound of various materials (e.g., precursors, binders, catalysts, filler material, resins, etc.), be a single material (e.g., a unitary compound), or any other suitable material. Additionally, the repair material can be a liquid-phase repair material that is solidified in situ (e.g., an epoxy compound), a solid material (e.g., neoprene), a paste, a gas, a matrix, or can have any other suitable composition.

Evaluation Subsystem 800

Figure 9:
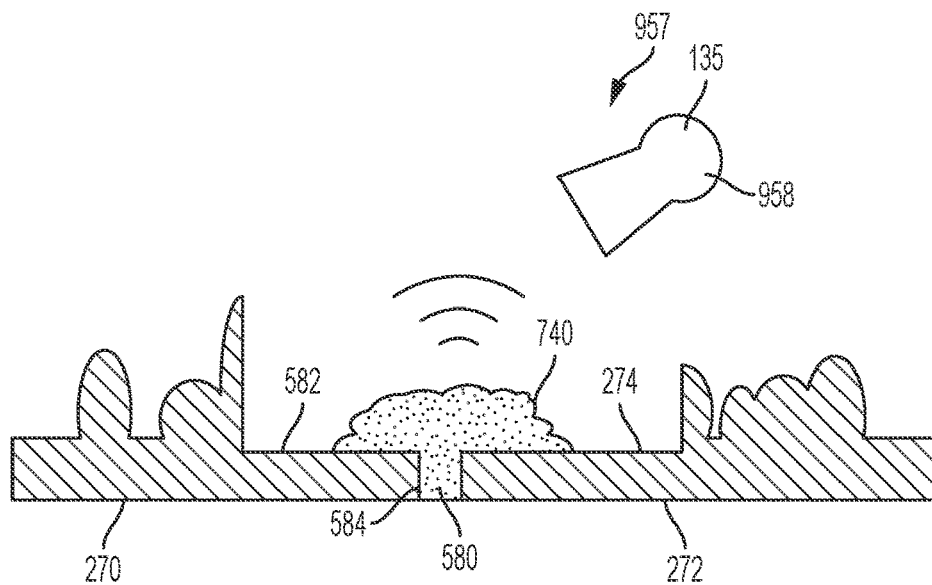
FIG. 9 is a cross-sectional view of the pipe of FIG. 5 and a leak evaluation mechanism, according to another aspect of the present disclosure.
Figure 10:
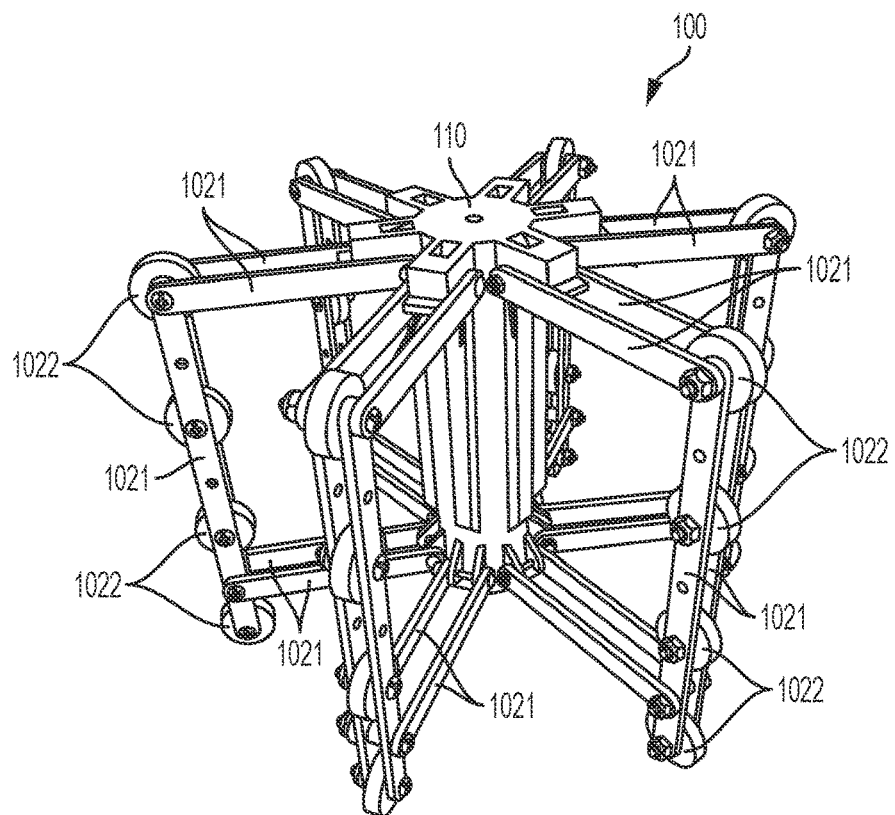
FIG. 10 is a perspective view of the leak detection and repair device according to another aspect of the present disclosure.
Figure 11:
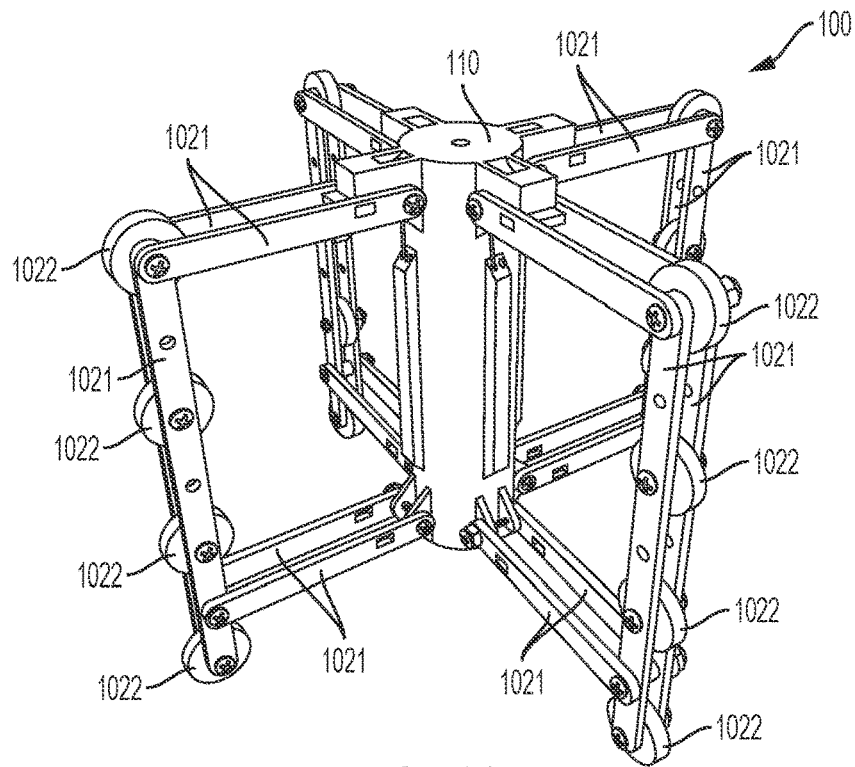
FIG. 11 is a perspective view of the leak detection and repair device according to another aspect of the present disclosure.
Figure 12:
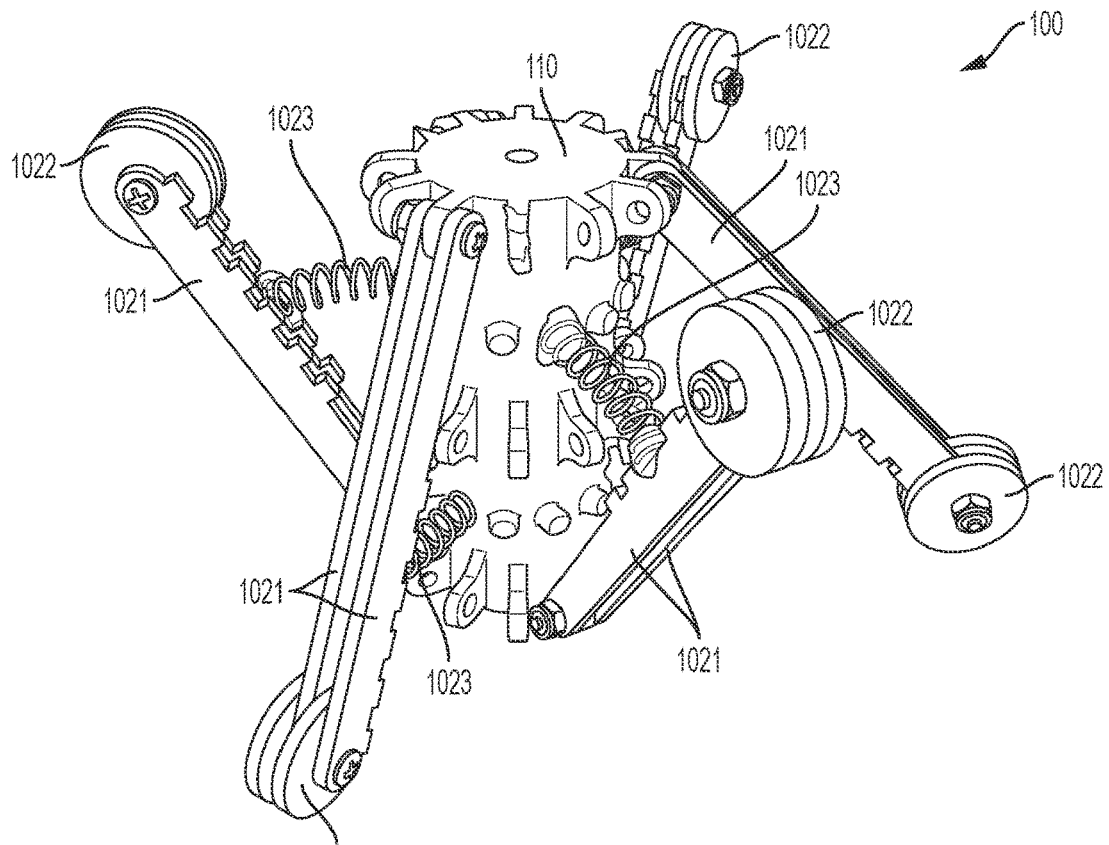
FIG. 12 is a perspective view of the leak detection and repair device according to another aspect of the present disclosure.
Figure 13:
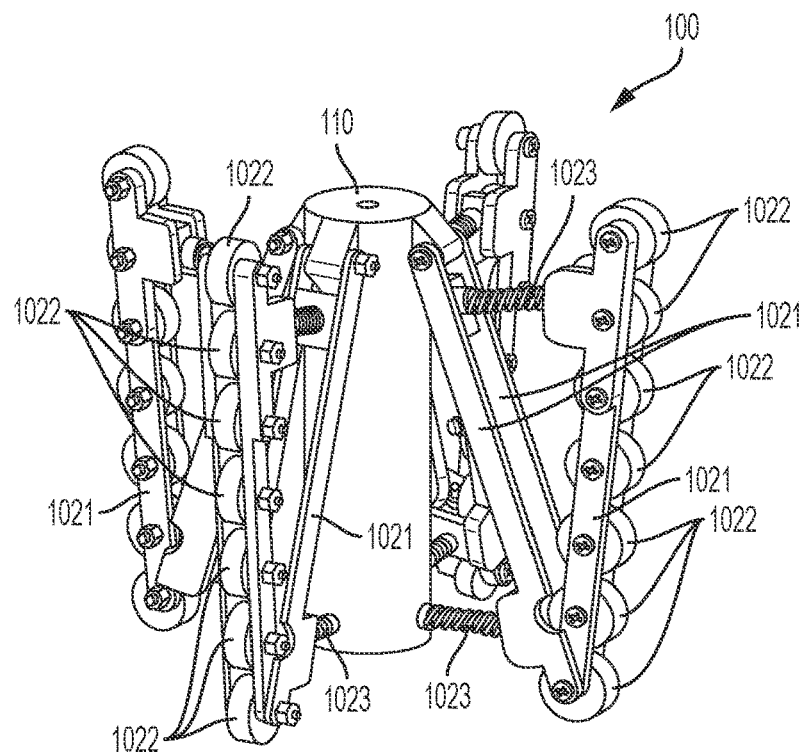
FIG. 13 is a perspective view of the leak detection and repair device according to another aspect of the present disclosure.
Figure 14:
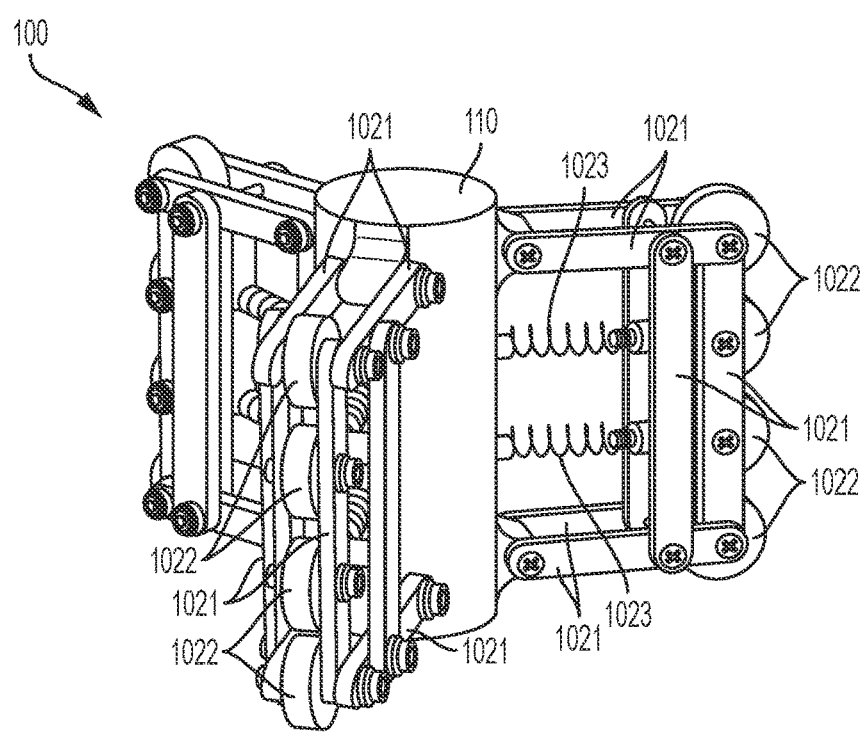
FIG. 14 is a perspective view of the leak detection and repair device according to another aspect of the present disclosure.

According to example aspects, the pipe repair device 100 can also comprise an evaluation subsystem 800. The evaluation sub-system can function to determine whether the repair successfully met a predetermined repair criteria (e.g., whether the leak 580 was stopped, whether the leak rate was reduced below a threshold leak rate, etc.). In example aspects, as shown in FIG. 9, the evaluation subsystem 800 can comprise a leak evaluation mechanism 957. An example aspect of the leak evaluation mechanism 957 can comprise the hydrophone 135 and a processor 958. In some example aspects, the processor 958 can be located on or within the pipe repair device 100, while in other aspects, the processor 958 can be located remote from the pipe repair device 100. The hydrophone 135 can extract a frequency power spectrum of noise in the pipe 272 proximal the leak region 582, and the processor 958 can identify an audio signature corresponding to the leak 580 and determine a change in the signature (e.g., disappearance of the audio signature, reduction of the audio signature signal power below a threshold signal power) indicative of leak repair and/or satisfaction of the predetermined repair criteria. However, the evaluation subsystem 800 can comprise any suitable components for evaluating the leak repair.

Methods of Use

Various methods for repairing a pipeline 270 with the pipe repair device 100 are disclosed. In an example aspect, a method for repairing the pipeline 270 can comprise the steps of inserting the pipe repair device 100 into a pipeline 270, detecting a leak 580 at a leak region 582 in the pipeline 270, transporting the pipe repair device 100 through the pipeline 270 to the leak region 582, and repairing the leak 580. In some aspects, the steps of detecting the leak 580 and transporting the pipe repair device 100 through the pipeline 270 can be performed concurrently. Further, in some aspects, the method can further comprise the step of detecting a second leak at a second leak region in the pipeline 270 before, during, or after the step of repairing the leak 580. Some methods can also comprise the steps of preparing the leak region 582 and/or evaluating the repaired leak 580.

In example aspects, the pipe repair device 100 can be inserted into the pipeline 270 at an existing access point, such as, for example, a fire hydrant, a service entrance, or any other suitable point of entry that allows for easy insertion of the pipe repair device 100 into the pipeline 270. Inserting the pipe repair device 100 into the pipeline 270 at an existing access point and remotely navigating the pipe repair device 100 through the pipeline 270 can eliminate the need to dig up the surrounding terrain to locate and repair the leak 580, which can save time and costs when performing repairs.

Once inserted into the pipeline 270, the leak detection subsystem 300 can detect a leak 580 in the pipeline 270 and can pinpoint the location of the leak 580 (e.g. leak region 582) in the pipeline 270. In a first aspect, the step of detecting a leak 580 can comprise visually identifying the leak region 582. Visually identifying the leak region 582 can comprise streaming video data collected via an image sensor 132 of the pipe repair device 100 to a remote operator in order to manually identify the leak region 582 based on the visibility of air bubbles entering the pipe 272 proximal the leak region 582 or by the visibility of damage to the pipeline 270. In a second aspect, detecting the leak 580 can comprise aurally identifying the leak region 582. Aurally identifying the leak region 582 can comprise tracking on or more hydrophones 135 proximal the inner surface 274 of the pipe 272 while transporting the pipe repair device 100 (e.g., using a locomotion subsystem 200), and identifying the axial and azimuthal position of the leak region 582 based on triangulation of hydrophone-derived audio signatures corresponding to leakage out of the pipeline 270.

Upon detection of a leak 580, the locomotion subsystem 200 can transport the pipe repair device 100 to the leak region 582. In one aspect, transporting the pipe repair device 100 through the pipeline 270 can comprise rolling the pipe repair device 100 along the inner surface 274 of the pipeline 270. Rolling along the inner surface 274 of the pipeline 270 can comprise biasing the one or more tracks 122 of the pipe repair device 100 against the inner surface 274 of the pipeline 270, supplying power to one or more motors of the pipe repair device 100, and driving the tracks 122 with the motors. In another aspect, transporting the pipe repair device 100 through the pipeline 270 can comprise propelling the pipe repair device 100 through the pipeline 270. Propelling through the pipeline 270 can comprising supplying power to one or more motors of the pipe repair device 100, and driving a propulsion mechanism with the motors. In example aspects, the propulsion mechanism can be an impeller, propeller, and/or any other suitable submersible propulsion mechanism.

In some aspects, a current of the fluid flowing in the pipeline 270 can assist in moving the pipe repair device 100 through the pipeline 270. In other aspects, a water hammer can be introduced into the pipeline 270 to generate a pressure force to assist in moving the pipe repair device 100 through the pipeline 270. As the pipe repair device 100 moves through the pipeline 270, fluid in the pipeline 270 can continue to flow around and/or through the pipe repair device 100. As such, the flow of fluid in the pipeline 270 can continue uninterrupted as the pipe repair device 100 is navigated through the pipeline 270. Such a configuration prevents the need to shut off the fluid flow during repairs, which can save costs for the service provider and prevent interruption of service to customers.

The method can optionally comprise the step of preparing the leak region 582 before repairing the leak 580. In one aspect, the step of preparing the leak region 582 can comprise preparing the inner surface 274 of the pipe 272 by removing material proximal the leak region 582. For example, a resurfacing mechanism 638 can reduce the surface roughness to produce a suitable (e.g., substantially smooth) surface at which to repair the leak 580. Preparing the inner surface 274 can comprise grinding, abrading, or otherwise mechanically preparing the inner surface 274, compressing the inner surface 274, chemically reacting the inner surface 274, or otherwise preparing the inner surface 274.

The step of preparing the leak region 582 can optionally comprise controlling a volume of the pipe 272 proximal the leak region 582 with a volume control mechanism. Preparing the leak region 582 can further comprise providing a suction force to the volume proximal the leak region 582 (e.g., to prevent removed pipe material and/or resurfacing material from contaminating the water flowing through the pipe 272) and/or providing a barrier to temporarily block and/or limit water flow passed the barrier (e.g., an inflatable bladder and/or balloon that can be expanded downstream of the leak region 582). However, in other aspects, a fire hydrant (not shown) can be opened downstream of the leak region 582, and any contaminated water can be flushed out.

Upon preparing the leak region 582, the leak 580 can be repaired. The step of repairing the leak 580 can comprise applying a repair material to the leak region 582 using a repair mechanism of the repair subsystem 400. In one aspect, the repair material can be a liquid-phase repair material, and applying the repair material can comprise, for example, suffusing the leak region 582 with an epoxy compound. In another aspect, the repair material can be a solid material, applying the repair material can comprise, for example, affixing a patch to the leak region 582.

Optionally, the repair material can comprise curable compounds. Thus, repairing the leak 580 can optionally comprise curing the curable compounds included in the repair material, such as by exposing the curable compounds to heat (e.g., heating the curable compounds using a heater of the repair subsystem 400), exposing the curable compounds to water (e.g., by introducing water into the controlled volume 746 proximal the leak region 582 and into which repair material has been applied), exposing the curable compounds to electromagnetic radiation (e.g., by shining ultraviolet light onto the leak region 582 at which repair material has been applied, using a light emitter of the repair subsystem 400), and/or by any other suitable mechanism or technique.

In one specific example aspect, repairing the leak 580 can comprise providing a stent 850 in a compressed configuration, the stent 850 comprising a spring 852 and a sealing layer 854, reconfiguring the stent 850 from the compressed configuration to an expanded configuration, and pressing the sealing layer 854 of the stent 850 against the inner surface 274 of the pipe 272 at the leak region 582 to create a water-tight seal between the sealing layer 854 and the leak region 582. Another example aspect of repairing the leak 580 can comprise spot-welding the leak 580. Spot-welding the leak 580 can comprise melting pipe material proximal the leak region 582 and/or additional metallic filler material into the leak region 582 (e.g., using a submersible welding head) and cooling the material (e.g., actively cooled, passively cooled) in situ to repair the leak 580.

Repairing the leak 580 can optionally comprise creating a controlled volume 746 surrounding the leak region 582, which can function to isolate the controlled volume 746 proximal the leak region 582 from the remainder of the internal volume of the pipe 272. The controlled volume 746 (e.g., repair lumen) can exhibit a flow rate through the controlled volume 746 that is less than a threshold flow rate (e.g., the background flow rate through the pipe 272, a predetermined threshold flow rate, etc.), but can alternatively exhibit any suitable flow rate. The controlled volume 746 can comprise a liquid water level (e.g., volume of liquid water) less than a threshold water level (e.g., less than 100% liquid water, less than 50% water, less than 10% water, etc.), but can alternatively comprise any suitable water level. The pressure within the controlled volume 746 can be less than a threshold pressure (e.g., the background pressure within the pipe 272, a predetermined fraction of the background pressure within the pipe 272, etc.), but can alternatively be any suitable pressure.

In a first aspect, creating the controlled volume 746 can comprise pushing a concave structure defining an open lumen against the inner surface 274 of the pipe 272 proximal the leak region 582. The concave structure can be a hemispherical structure, a conical structure, and/or any other suitable structure exhibiting any suitable degree of concavity. The open lumen can be transformed into a closed lumen upon arranging the concave structure adjacent to the inner surface 274, wherein the inner surface 274 and the concave structure cooperatively define the controlled volume 746 about the leak region 582. However, the controlled volume 746 can be otherwise suitable defined. The concave structure can comprise at least one orifice through which the repair material can be introduced (e.g., injected, pumped).

In a second aspect, creating the controlled volume 746 can comprise pushing an expandable bladder against the inner surface 274 of the pipe 272 proximal the leak region 582. Repairing the leak 580 can comprise injecting repair material (e.g., binder) into the expandable bladder, and bursting the bladder adjacent to the leak region 582 to form a mound of repair material covering the leak region 582. Bursting the bladder can be performed by utilizing the inner surface 274 (e.g., rough features of the inner surface 274, sharp features of the inner surface 274) to puncture the surface of the bladder, utilizing an internal puncture mechanism to burst the bladder, or can be otherwise performed in any other suitable manner.

In a third aspect, creating the controlled volume 746 can comprise expanding a first balloon upstream of the leak region 582 to block upstream pipe flow (e.g., reduce the upstream flow below a threshold flow rate), and expanding a second balloon downstream of the leak region 582 to block flow downstream of the pipe repair device 100 and/or backflow (e.g., reduce the downstream flow and/or backflow below a threshold flow rate). This variation can optionally comprise pumping the water within the controlled volume 746 defined between the first and second balloon. In example implementations, the pipe repair device 100 can define a water flow path between the first and second balloon and can actively augment the flow rate (e.g., using an impeller, a reciprocating pump, etc.) between the first and second balloon along the flow path in order to reduce the upstream pressure rise caused by the first (upstream) balloon (e.g., matching the flow rate to the background flow rate through the pipe 272.) The step of repairing the leak 580 can then be performed.

A specific aspect of repairing the leak 580 can comprise isolating the leak region 582 from the surrounding pipe 272 by pressing a flexible cap 742 against the inner surface 274 of the pipe 272, creating a fluid-impermeable seal around the leak region 582, and pumping epoxy reagents 740 into the repair lumen defined within the flexible cap 742 (e.g., proximal the isolated leak region 582). This example aspect can further comprise mixing the epoxy reagents 740 within the repair lumen (e.g., using an agitator, by modulating the in-flow of the reagents 740 to layer the reagents 740 within the lumen such that passive diffusion processes result in mixing, etc.). However, other aspects can comprise pre-mixing the reagents and subsequently pumping the epoxy reagents 740 into the repair lumen, and/or otherwise suitably mixing the epoxy reagents 740 (e.g., impregnating an inner surface 743 of the flexible cap 742 with an epoxy reagent 740 such that contact between an injected epoxy component and the inner surface 743 of the flexible cap 742 results in reagent mixing).

Another specific example aspect of repairing the leak 580 can comprise providing an epoxy applicator that can comprise a flexible tube (not shown) attached to a linear actuator, actuating the epoxy applicator proximal to the leak region 582, wherein an outlet of the flexible tube is arranged adjacent to the leak region 582, forcing a quantity of epoxy through the tube to create an epoxy bead that covers the leak region 582, pausing for a predetermined time period (e.g., 10 seconds, 10 minutes, 1 hour, etc.) for the epoxy to transition to a solid state (e.g., a cured state), and mechanically separating the solidified epoxy bead from the tube (e.g., using a guillotine of the repair subsystem 400 such as a single bladed guillotine, a double bladed guillotine, etc.). In some aspects, as described above, the tube can be a mixing nozzle.

Example aspects of the method can also comprise the step of evaluating the repair. Evaluating the repair can be performed by the evaluation subsystem 800. A first aspect of evaluating the repair can comprise visually evaluating the repair. Visually evaluating the repair can comprise collecting imagery data at an image sensor 132 of the pipe repair device 100 and transmitting the imagery data to a remote operator (e.g., wherein the remote operator views the imagery data rendered on a display outside the pipe) that can manually evaluate that the leak rate has been reduced below a threshold level. A second aspect of evaluating the repair can comprise sonically evaluating the repair. Sonically evaluating the repair can comprise collecting auditory data at a hydrophone 135 of the pipe repair device 100, extracting auditory signatures from the auditory data, and determining that the auditory signatures are indicative of a reduced fluid leakage rate (e.g., reduced below a threshold leakage rate, reduced by a predetermined ratio relative to an initial leakage rate, etc.).

Advantages

In summation, the leak detection and pipe repair device 100 of the present disclosure and the associated methods can provide several benefits and advantages. First, aspects of the pipe repair device 100 and method can be used to perform in situ leak repair, without the need to break ground and expose leaking pipe(s) by opening a trench over the pipe location. Second, aspects of the pipe repair device 100 and method can enable pressurized pipe repair. The device can be inserted through existing access points (e.g., hydrants) that can be subsequently sealed and re-pressurized, such that the pipe does not require draining and/or isolation from the fluid distribution network. Third, aspects of the method do not contaminate pipes in which the method is performed, and therefore can be used in potable water piping system without the need for decommissioning and re-certifying water pipes to carry potable water. Fourth, aspects of the pipe repair device 100 can define a physically compact form factor, and thus can enable the repair of pipes having small diameters (e.g., as small as approximately four inches in diameter) and thus can vastly increase the fraction of the fluid distribution networks (e.g. water distribution network) that can be serviced by in situ pipe repair devices 100. Fifth, aspects of the pipe repair device 100 and method can enable in situ identification of leak location, severity, and other leak characteristics. Instead of determining water or fluid loss in a sectional manner as in conventional methods (e.g., measuring flow rates between disparate positions along a pipe to infer that a leak is present at a location between the outlets), the leak region can be determined with high positional specificity from within the pipe itself using aspects of the method. Thus, leaks can be located and repaired more rapidly, efficiently, and effectively. Sixth, aspects of the pipe repair device 100 and method can enable in situ evaluation of leak repair. Conventional devices and methods often require re-pressurization of exposed pipes to identify leaks that have not been repaired and/or failed leak repairs; in addition to being expensive and inefficient, this can cause pipe damage. However, evaluation of leak repair(s) in situ can eliminate trenching costs and enhances efficiency, while avoiding the risk of further pipe damage through re-pressurization. The aspects described above and other aspects of the pipe repair device 100 and/or methods contemplated herein can comprise any other suitable benefits and/or advantages.

One should note that conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more particular embodiments or that one or more particular embodiments necessarily include logic for deciding, with or without user input or prompting, whether these features, elements and/or steps are included or are to be performed in any particular embodiment.

It should be emphasized that the above-described embodiments are merely possible examples of implementations, merely set forth for a clear understanding of the principles of the present disclosure. Any process descriptions or blocks in flow diagrams should be understood as representing modules, segments, or portions of code which include one or more executable instructions for implementing specific logical functions or steps in the process, and alternate implementations are included in which functions may not be included or executed at all, may be executed out of order from that shown or discussed, including substantially concurrently or in reverse order, depending on the functionality involved, as would be understood by those reasonably skilled in the art of the present disclosure. Many variations and modifications may be made to the above-described embodiment(s) without departing substantially from the spirit and principles of the present disclosure. Further, the scope of the present disclosure is intended to cover any and all combinations and sub-combinations of all elements, features, and aspects discussed above. All such modifications and variations are intended to be included herein within the scope of the present disclosure, and all possible claims to individual aspects or combinations of elements or steps are intended to be supported by the present disclosure.

That which is claimed is:

1. A pipe repair device comprising:
a body defining a first end and a second end opposite the first end;
a stent configurable in a compressed configuration and an expanded configuration, the stent mounted to the body in the compressed configuration; and
a locomotion subsystem configured to drive the pipe repair device through a pipe, the locomotion subsystem comprising a steering rod extending from the first end of the body and configured to engage an inner surface of the pipe.

2. The pipe repair device of claim 1, wherein the steering rod is selectively movable relative to the body to be point in a preferred direction of movement.

3. The pipe repair device of claim 2, wherein:
the pipe repair device further comprises a power subsystem configured to supply and carry electrical power to the locomotion subsystem;
the locomotion subsystem further comprises a motor; and
the power subsystem carries the electrical power to the motor.

4. The pipe repair device of claim 3, wherein the motor drives the movement of the steering rod.

5. The pipe repair device of claim 4, wherein the power subsystem further comprises a tether carrying the electrical power to the motor.

6. The pipe repair device of claim 3, wherein the locomotion subsystem further comprises at least one of a wheel and a continuous track, wherein the at least one of a wheel and a continuous track is configured to engage the inner surface of the pipe, and wherein rotation of the at least one of a wheel and a continuous track is driven by the motor.

7. The pipe repair device of claim 6, wherein the at least one of a wheel and a continuous track is radially repositionable relative to the body.

8. The pipe repair device of claim 1, wherein the stent comprises a spring and a sealing layer wrapped around a circumference of the spring, the sealing layer comprising a flexible and compressible repair material, wherein the spring biases the stent to the expanded configuration.

9. The pipe repair device of claim 8, wherein the stent defines a cylindrical structure, a void extending through a center of the cylindrical structure, the void configured to allow fluid to flow therethrough.

10. The pipe repair device of claim 9, wherein the body defines a middle section disposed between the first end and the second end, and wherein the middle section is received through the void of the stent.

11. A pipe repair device comprising:
a body;
a stent configurable in a compressed configuration and an expanded configuration, the stent mounted to the body in the compressed configuration; and
a leak detection subsystem comprising at least one sensor, the at least one sensor configured to identify a position of a leak in a pipeline;
wherein:
the pipe repair device is transportable through the pipeline to the leak, and wherein the stent is expandable to the expanded configuration to seal the leak;
the at least one sensor comprises at least one acoustic microphone for aurally identifying the leak; and
the at least one acoustic microphone comprises at least one hydrophone configured to identify an axial position and an azimuthal position of the leak based on triangulation of hydrophone-derived audio signatures corresponding to the leak.

12. The pipe repair device of claim 11, wherein the at least one sensor comprises at least one image sensor for visually identifying the leak.

13. The pipe repair device of claim 12, wherein the at least one image sensor comprises at least one camera, and wherein the pipe repair device streams data collected from the at least one camera to a remote user to allow the remote user to visually identify of the leak.

14. The pipe repair device of claim 13, wherein the pipe repair device further comprises a light configured to illuminate an interior of the pipeline.

15. The pipe repair device of claim 11, wherein the at least one sensor comprises an image sensor for visually identifying the leak and an acoustic microphone for aurally identifying the leak.

16. The pipe repair device of claim 11, further comprising a locomotion subsystem configured to drive the pipe repair device within the pipeline to the leak, the locomotion subsystem comprising at least one of a wheel and a continuous track, wherein the at least one of a wheel and a continuous track is configured to engage an inner surface of the pipeline.

17. The pipe repair device of claim 16, wherein the at least one of a wheel and a continuous track is radially repositionable relative to the body.

18. The pipe repair device of claim 16, wherein the stent comprises a spring and a sealing layer wrapped around a circumference of the spring, the sealing layer comprising a flexible and compressible repair material configured to engage the inner surface of the pipeline in the expanded configuration, wherein the spring biases the stent to the expanded configuration.

19. A pipe repair device comprising:
a body;
a stent configurable in a compressed configuration and an expanded configuration, the stent mounted to the body in the compressed configuration;
a leak detection subsystem comprising at least one sensor, the at least one sensor configured to identify a position of a leak in a pipeline, wherein the pipe repair device is transportable through the pipeline to the leak, and wherein the stent is expandable to the expanded configuration to seal the leak; and
a locomotion subsystem configured to drive the pipe repair device within the pipeline to the leak, the locomotion subsystem comprising at least one of a wheel and a continuous track, wherein the at least one of a wheel and a continuous track is configured to engage an inner surface of the pipeline;
wherein the stent comprises a spring and a sealing layer wrapped around a circumference of the spring, the sealing layer comprising a flexible and compressible repair material configured to engage the inner surface of the pipeline in the expanded configuration, wherein the spring biases the stent to the expanded configuration.

\* \* \* \* \*